United States Patent [19]

Veenhof

[11] Patent Number: 4,703,845

[45] Date of Patent: Nov. 3, 1987

[54] SCRAPER STRANDS FOR CONVEYOR BELT CLEANERS

[76] Inventor: Willem D. Veenhof, 4501 Soundside Dr., Gulf Breeze, Fla. 32561

[21] Appl. No.: 799,435

[22] Filed: Nov. 19, 1985

[51] Int. Cl.⁴ .............................................. B65G 45/00
[52] U.S. Cl. ..................................... 198/499; 15/256.5
[58] Field of Search ............... 198/497, 498, 499, 716; 15/256.5

[56] References Cited

U.S. PATENT DOCUMENTS

| | | | |
|---|---|---|---|
| 2,586,538 | 2/1952 | Hapman | 198/716 |
| 3,047,133 | 7/1962 | Searles | 198/499 X |
| 3,430,758 | 3/1969 | Searles | 198/498 |
| 4,349,098 | 9/1982 | Veenhof | 198/499 X |
| 4,498,577 | 2/1985 | Veenhof | 198/499 |

Primary Examiner—Jeffrey V. Nase
Attorney, Agent, or Firm—Glaser, Griggs & Schwartz

[57] ABSTRACT

A conveyor belt cleaning assembly including at least one generally transversely extending cleaning device, engaging, in an operative position, a conveyor belt surface to be cleaned. The cleaning device includes a plurality of wear resistant scraper elements supported by a flexible tension member and resilient spacer coils coupled between the tension member and scraper elements for compressively engaging and yieldably maintaining the scraper elements at separate scraper positions along the tension member. Cable strand damage caused by pinching engagement of the scraper elements in response to deflection movement is reduced by mechanically decoupling the spacer coil end turns with respect to the cable. The scraper elements are mechanically engaged by oversized compression coils and spacer sleeve combinations, with scraper element deflection forces being reacted by axial compression of the spacer coils.

4 Claims, 13 Drawing Figures

SCRAPER STRANDS FOR CONVEYOR BELT CLEANERS

FIELD OF THE INVENTION

This invention relates to cleaning or scraping devices utilized for removing material which adheres to a conveyor belt or pulley drum.

BACKGROUND OF THE INVENTION

In the operation of bulk material conveyors, a belt scraper assembly is provided for removing adhering material from the conveyor belt and depositing it into a discharge area. In the absence of a cleaning device, or as a result of a poorly functioning belt scraper, carry-over will be accumulated beneath the conveyor belt. In addition to consituting a nuisance, a large amount of valuable product will be deposited beneath the conveyor and may build up sufficiently to interfere with operation of the conveyor. For example, a volume of spillage material 1/16" (1.6 mm) deep and 1" (25 mm) wide will produce approximately 2½ cubic feet (0.075 cubic meters) of carry-over per 100 feet per minute (0.48 meters per second) of belt speed each hour. At a conveyor speed of 500 feet per minute (2.5 meters per second), this small stream produces approximately 10 tonnes of carry-over spillage every eight hours, based on a density of 100 lbs per cubic foot (1500 kg/cubic meter).

Consequently, there is considerable interest in improving the operation and efficiency of conveyor belt cleaning devices, which generally include one or more scraper blades disposed in a plane transverse to the conveyor belt and are urged toward the belt so as to cause engagement of an edge of the blade with the belt surface. The belt cleaning device is hampered constantly by obstructions such as mechanical fasteners moving at high speeds, which are often driven by hundreds of horsepower. Moreover, if the belt reverses, the reverse movement of the conveyor belt can drive the blades into the belt and cause tearing of the conveyor belt or damage to the scraper. This problem occurs frequently on inclined conveyors where the hold back allows the belt to reverse even a few inches before locking. It also occurs when a traveling tripper is moved forward when the belt is stopped.

DESCRIPTION OF THE PRIOR ART

Among the various improved belt scrapers which have been proposed or are now in use are conveyor belt scrapers as disclosed by Willem Dirk Veenhof in U.S. Pat. Nos. 4,349,098 and 4,498,577. According to those arrangements, a conveyor belt cleaning assembly includes a plurality of wear resistant scraper elements threaded onto a flexible tension member for yieldable engagement with the curved surface of the conveyor belt. This belt cleaner assembly is located beneath the overhang defined by the discharge pulley drum. The cleaner assembly includes two crossbars and an array of diagonally extending cleaning members mounted between the crossbars. Each flexible tension member and associated scraper elements are held in a helical course of engagement with the curved surface of the conveyor belt. An uppermost crossbar is located inwardly of the overhang portion of the pulley so that discharged material will not wedge between the belt surface and the bar. The lower crossbar is located near the tangent line of the belt and pulley. The acurate course followed by the separate scraper strands closely conforms with the curved surface of the conveyor belt in the overhang region. Elastic tension induced in each flexible scraper strand translates into a yieldable thrust applied against the conveyor belt surface.

In the arrangement disclosed in U.S. Pat. No. 4,498,577, each cleaning member is composed of a series of scraper elements of wear resistant material threaded onto a flexible cable. The scraper elements are separated by spacer springs. The spacer springs keep the scraper element perpendicular to the belt surface but allow the elements to deflect to permit obstructions, such as mechanical fasteners, to pass without snagging or damaging the belt or the scraper assembly.

The foregoing conveyor belt scraper assemblies have proven effective and efficient in cleaning conveyor belt surfaces in a wide variety of applications. However, the flexible cable tension members onto which the scraper elements are mounted have been worn prematurely as a result of pinching engagement by the scraper elements in response to deflection of the scraper elements during operation. Such pinching action is directed to opposite sides of the cable T as illustrated in FIG. 2 of the drawings. In the prior art arrangement, an insert ferrule F lodged within the central opening of the scraper element E forms a pocket in which the last coil turn of spacer coil S is lodged or captured. The scraper element E drives the coil turn against the cable T substantially at two points, designated as pinch points, on opposite sides of the cable T. Each scraper element E is resiliently biased by the adjoining coil spacers for return to an upright orientation after being momentarily deflected by the belt B. However, such repeated pinching engagement weakens the individual strands of the cable T which ultimately renders that particular cable unserviceable, and under some conditions, may cause it to break.

OBJECTS OF THE INVENTION

It is the principal object of this invention to provide a conveyor belt cleaning device which, at least in some respect, overcomes one or more of the above-mentioned limitations of conveyor belt cleaning devices.

Another object of this invention is to provide an improved conveyor scraper strand of the type having scraper elements which are spring loaded for automatic recovery after deflection.

A related object of this invention is to provide an improved scraper strand assembly in which strand damage caused by pinching engagement of deflecting scraper elements is avoided or at least substantially reduced.

SUMMARY OF THE INVENTION

In accordance with one aspect of this invention, there is provided a conveyor belt cleaning device including at least one generally transversely extending cleaning member, engaging, in the operative position, a conveyor belt or pulley drum surface to be cleaned, the cleaning member including an elongated flexible tension member, a series of wear resistant scraper elements movably mounted onto the tension member, and resilient spacer means coupled to the tension member and yieldably separating the scraper elements. According to this arrangement, the scraper elements are maintained in an upright position relative to the surface to be cleaned, with the scraper elements deflecting to permit a surface irregularity such as a lacing, seam, or protruding mechanical structure such as a fastener or the like to pass without snagging and damaging the scraper assembly.

In a preferred embodiment of this invention, the flexible tension member is a stainless steel cable or polyurethane strand, either solid or stranded, and each scraper element is movably coupled to the tension member. The scraper elements are yieldably separated by coil springs which encircle the tension member between adjacent scraper elements. The spacer coils and scraper elements are compressed together along the length of the tension member so that each scraper element is compressively engaged between spacer coils, but with each scraper element being slightly rotatable with respect to the tension member. Each scraper element is resiliently biased by the coil spacers for return to an upright position after being deflected. The yieldable compression is balanced on each side of the scraper element so that it can deflect momentarily to allow a surface irregularity or belt protrusion to pass without snagging or otherwise causing damage.

Cable strand damage caused by pinching engagement of the scraper elements in response to deflection is avoided or at least substantially reduced in the present invention by decoupling the spacer coil end turns with respect to the ferrule insert/scraper pocket. That is, the first and last turns of the spacer coil are mechanically supported in such a manner that damaging end turn engagement cannot occur. In particular, the spacer coil end turns are arranged and supported whereby the scraper deflection forces are reacted substantially by axial compression of the spacer coil, with the deflection loading being distributed through the body of the spacer coil rather than being directed radially onto the tension cable.

In one embodiment, the scraper elements are compressively engaged by spacer coil springs of the type having large dimeter end turn portions which engage each scraper element at a location nearer to the scraping edge than to the tension member. In this embodiment, the spacer coil springs are flared from an intermediate, reduced diameter coil portion to relatively large diameter end turn portions, which provides close coupling engagement of the intermediate coil portion with the cable tension member while relocating the spacer coil end turn portions out of the ferrule insert/scraper pocket and away from the tension member.

In another embodiment, the scraper elements are provided with an insert ferrule having a central opening bounded by a rounded shoulder through which the tension member is threaded, thereby avoiding damaging contact with the sharp edge of the scraper element central opening. In this embodiment, the axial dimention of the ferrule insert is embodiment, the axial dimension of the ferrule insert is extended at least by a distance of one or more spacer coil turns, with the spacer coil end turns being fitted over the extended ferrule insert portions in telescoping engagement therewith.

In a second variation of the foregoing extended ferrule embodiment, the outside diameter of the spacer sleeve portions is large relative to the diameter of the tension member, with engagement of the spacer sleeve portions occurring near the scraping edge of the scraper element, and with the spacer coil being compresively engaged between adjoining sleeve portions.

According to another embodiment, a spacer sleeve is fitted about the tension member between two scraper elements, and a large diameter compression coil is fitted coaxially about the spacer sleeve. The spacer sleeve is shorter than the coil spring when it is compressed to the desired loading level.

In yet another embodiment, a tubular spacer of resilient material, having a diameter which is large relative to the diameter of the tension member, is compressed between adjacent scraper elements, with the tension member being threaded through the scraper elements and resilient spacer.

The elements essential to the successful practice of all aspects of the invention include an elongated flexible tension member, a plurality of wear resistant scraper elements movably coupled to the tension member, and resilient spacer means compressively engaging and yieldably separating the scraper elements, whereby the scraper deflection forces are reacted substantially by axial compression of the resilient spacer means, rather than being transmitted radially onto the tension member.

DESCRIPTION OF THE DRAWINGS

In order that the invention may be more fully understood, multiple embodiments thereof will now be described with reference to the accompanying drawings in which.

DESCRIPTION OF THE PREFERRED EMBODIMENTS

Figure 1:
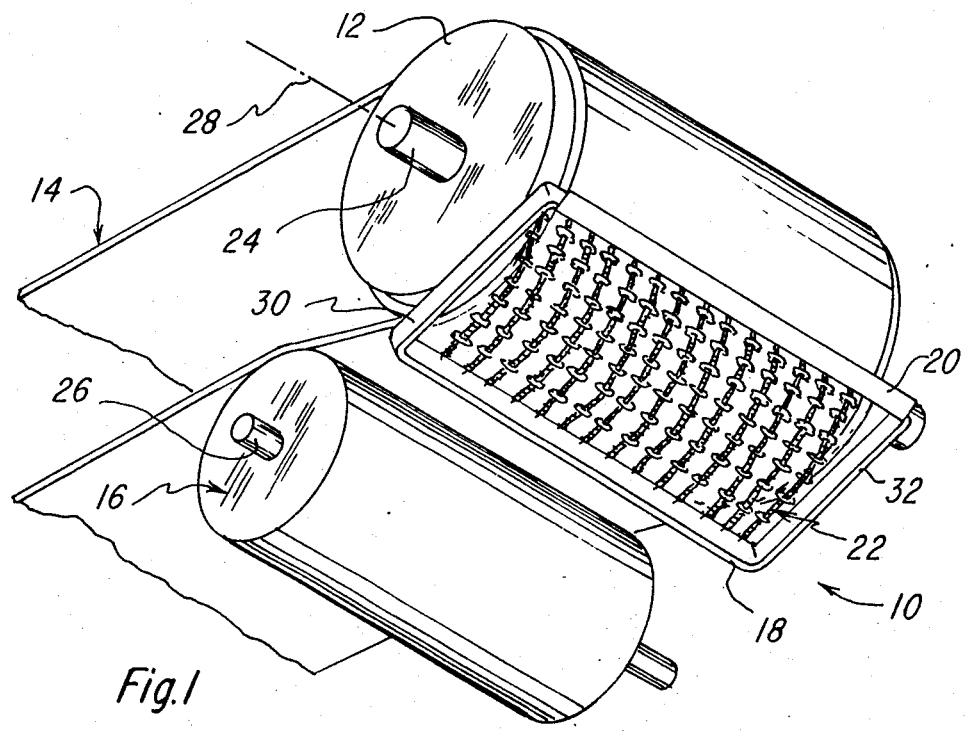
FIG. 1 is a perspective underneath view of a head pulley drum of a conveyor belt assembly, illustrating one form of conveyor belt cleaning device in operation.

In the description which follows, like parts are marked throughout the specification and drawings with the same reference numerals, respectively. The drawings are not necessarily to scale and in some instances portions have been exaggerated in order to more clearly depict certain features of the invention.

Figure 2:
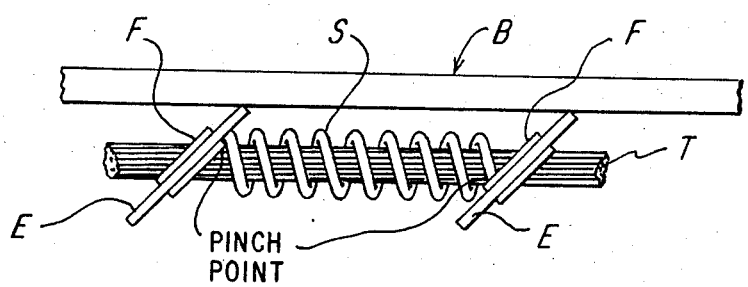
FIG. 2 is a side elevation view which illustrates operative engagement of a prior art scraping device.

Referring now to FIGS. 1 and 2 of the accompanying drawings, a conveyor belt cleaning assembly generally indicated by the numeral 10 is located beneath the overhang of a head pulley drum 12 supporting a conveyor belt 14 passing therearound. The conveyor belt 14 is an endless flexible belt, operating over drive, tail-end and bend pulleys 16, and over belt idlers or a slider bed. The conveyor belt 14 is suitable for handling many materials and a wide range of particle sizes over long distances, up and down slopes.

For simplicity of illustration, the supporting framework and structure have been omitted from the accompanying sketches so that no support means are illustrated for two parallel, transversely extending bars 18 and 20 which form the main supports for an array of belt cleaning devices 22 in the cleaning assembly 10. It will be understood that the head pulley drum 12 and bend pulley 16 are mounted on shafts 24, 26, respectively, which are supported at opposite ends for rotation on bearings in the usual manner.

The uppermost transverse bar 20 is located inwardly of the overhang portion of the head pulley drum so that conveyed material, in particular lumps thereof, will not become wedged between the belt surface and the bar 20. The lower support bar 18 is located substantially beneath the axis 28 of rotation of the head pulley drum 12 and a small distance away from the belt surface itself. The support bars 18, 20 are stabilized at each end by braces 30, 32.

The line between the two support bars 18, 20 intersects the arcuate surface of the conveyor belt 14 and thus a flexible conveyor belt cleaning member is required. Flexibility is provided in the form of a scraper strand 22 including a series of scraper elements 34 of a wear resistant material such as tungsten carbide or hard steel alloys movably threaded onto a high strength flexible tension member 36. The tension member 36 is preferably a multiple strand cable of stainless steel. However, other high strength, flexible materials such as a synthetic polymer material, for example polyurethane, either stranded or solid, may be used to good advantage.

Figure 3:
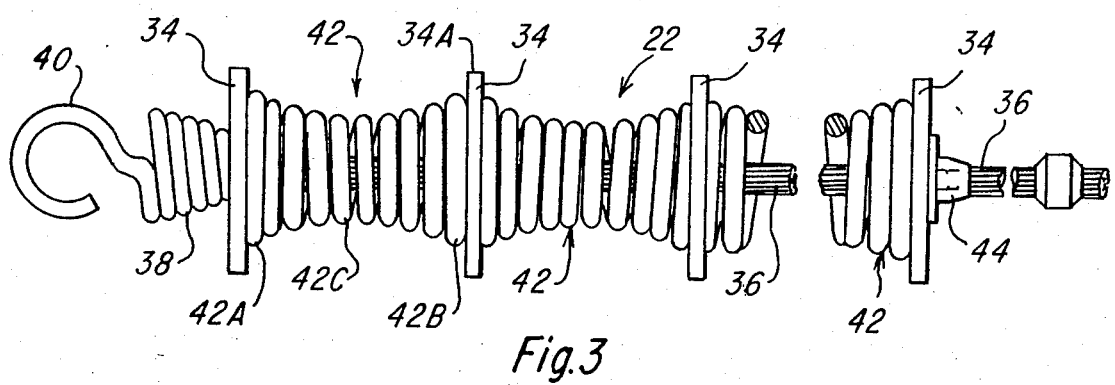
FIG. 3 is a side elevational view of a conveyor belt scraping device constructed according to a preferred embodiment of the present invention.

The flexible cleaning device 22 includes at least one anchor spring 38 connected in its length with a hook fastener 40 as can best be seen in FIG. 3. Each scraper element 34 is snugly fitted about the tension member 36, but is slightly rotatable about the tension member. Moreover, each scraper element 34 is movable with respect to the tension member so that it will deflect or twist and give way to a surface irregularity without snagging and causing damage.

According to a preferred embodiment of the invention, as illustrated in FIG. 3, the scraper elements 34 are separated by resilient spacer, preferably a stainless steel coil spring 42 having a double flare or hour-glass profile. That is, the spacer coil 42 has large diameter end turn portions which engage each scraper element at a location nearer to the scraping edge 34A than to the tension member 36. As a result of the engagement of the large diameter coil end turn portion against the scraper element 34, deflection forces are transmitted substantially axially through the body of the coil 42. Accordingly, the deflection loading is reacted by axial compression of the coil spring, rather than being directed radially onto the cable 36. In this preferred embodiment, the spacer coil spring 42 is flared from an intermediate, reduced diameter coil portion 42C which provides close coupling engagement of the spacer coil with the cable tension member 36, to the large diameter end turn portions 42A, 42B, respectively.

The flexible tension member 36 is threaded through each scraper element 34 and through each spacer coil 42, with the scraper element 34 at the extreme left end of the tension member being jammed against the anchor spring 38. The anchor spring 38 is retained onto the tension member 36, preferably by a crimp band. The scraper elements 34 and spacer coils 42 are uniformly compressed against each other along the length of the tension member 36 and are maintained in compressional engagement by a crimp band 44 fastened onto the opposite end of the cable 36.

The desired amount of compression force is developed by compressing the spacer coils 42 and scraper elements 34 between the crimp bands. A scraper element 34 is disposed between the anchor spring 38 and the adjoining spacer coil 42. Each clamp band is disposed in crimped engagement with the tension member 36 at opposite ends, respectively. According to this arrangement, the scraper 34 and compression coils 42 undergo compressive loading at all times, whereby the scraper elements 34 automatically return to the upright scraping position relative to the conveyor belt after being deflected by a conveyor belt surface irregularity such as a protruding fastener.

Any suitable number of conveyor belt cleaning devices 22, as just described, may be provided to extend across the entire width of a conveyor belt. In this particular embodiment of the invention, there are illustrated fourteen such cleaning strands or courses 22, but it will be appreciated that fewer or more such devices, as desired, may be utilized to good advantage, with the scraper element size and transverse angle being adjusted to ensure complete surface coverage, according to conveyor belt width.

In the illustrated embodiment of the invention, each of the conveyor belt cleaning devices 22 has one end of the cable 36 secured to the upper transverse support bar 20, with the hook 40 engaging the lower, trailing crossbar 18. The cleaning member 22 is held in contact with the belt surface by the cable 36 which is attached, at its other end, to the upper transverse support bar 20 at a position laterally spaced relative to the point of attachment to the lower support bar. Thus, each of the conveyor belt cleaning strands or courses 22 will follow a substantially helical path akin to a multistart thread of great pitch.

It will be understood that as a result of the anchor spring 38 and the flexible nature of the tension member 36, each of the above-described conveyor belt cleaning devices 22 will be held in yieldable thrusting engagement with the surface of the conveyor belt 14 apart from its leading and trailing end regions. The fourteen conveyor belt cleaning members 22, illustrated in this particular embodiment of the invention, are arranged such that they overlap in their operative positions and thereby clean the entire width of the conveyor belt apart, possibly, from the absolute edge regions thereof.

The upper end of the cleaning device 22 is coupled to the upper support bar 20 by means of the hook attachment portion 40 of the anchor spring 38. The lower end, however, is adjustably coupled to the lower support bar 18 in a notched opening in the lower support bar which forms a yoke. To establish the desired amount of tension in the scraper device, the upper end is fastened through a hooking eye in the upper support bar 20, with the lower end being pulled for a predetermined extension of the anchor spring 38. When the desired tension level is reached as the anchor spring is extended, the lower end of the cable 36 is inserted into the notch, thereby anchoring the lower end in place with the desired amount of tension established in the scraper cable.

Inasmuch as the shape and design of the scraper elements 34 may be varied substantially, the above-described rectangular scraper element construction is not intended to be limiting on the scope of this invention. For example, the scraper elements 34 may be oval or oblong.

Figure 4:
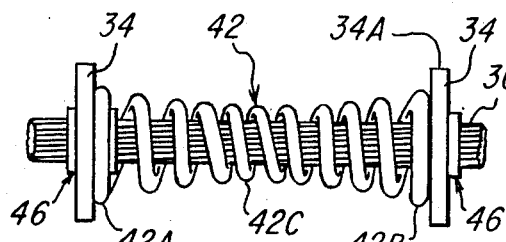
FIG. 4 is a side elevational view of a portion of an alternative scraper assembly.
Figure 4A:
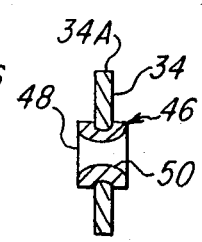
FIG. 4A is a sectional view of a scraper element taken along the line A—A of FIG. 5.
Figure 4B:
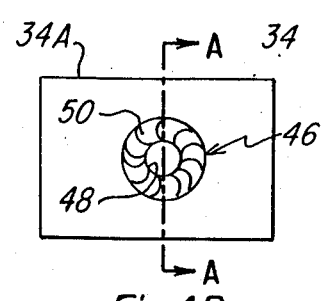
FIG. 4B is a front elevational view of a scraper element.

Referring now to FIGS. 4, 4A and 4B, additional protection against the effects of reaction pinch forces is provided by an insert ferrule 46 which is mounted within the central opening of the scraper member through which the tension member 36 is threaded, threreby shielding the tension member with respect to the sharp edge of the scraper element central opening. The ferrule opening 48 is sized appropriately for a snug fit around tension member 36, and is provided with a rounded inside shoulder 50 which bears against the tension member 36 as the scraper element 34 is twisted or deflected during operation. In this arrangement, the large diameter end portions 42A, 42B of the spacer coil 42 are fitted about the external cylindrical shoulder portion of the ferrule 46.

Figure 5:
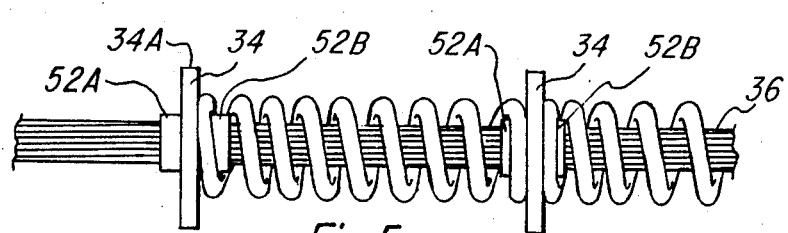
FIG. 5 is an elevational view illustrating an alternative embodiment conveyor belt cleaning device.

Referring to FIG. 5, it is sometimes desirable to use a large diameter spacer coil which is not flared. In such an arrangement, coupling engagement between the spacer coil and the scraper element is provided by large diameter spacer sleeves 52A, 52B. According to this arrangement, a large diameter spacer coil 54 is compressively engaged between adjacent scraper elements 34, with the spacer sleeves 52A, 52B being received in telescoping engagement with the end portions of the spacer coil 54. The axial dimension of each sleeve 52A, 52B exceeds one spacer coil turn, but preferably is less than two coil turns, with the spacer coil end turns being fitted over the spacer sleeve portions. A spacer sleeve length of two or more coil turns will provide more protection against pinch damage, but will also tend to limit the range of scraper deflection.

Figure 6:
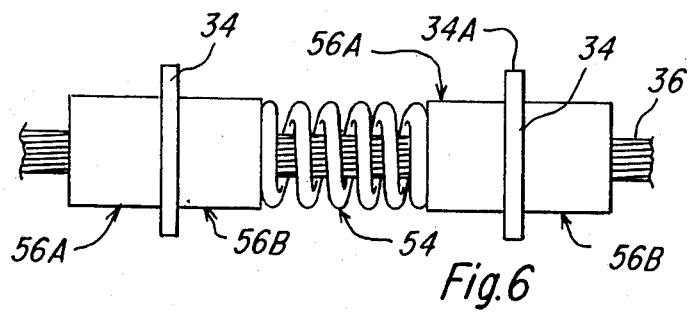
FIG. 6 is an elevational view of yet another alternative embodiment of a conveyor belt cleaning device.

Referring now to FIG. 6, a variation of the foregoing extended sleeve embodiment is illustrated. According to this arrangement, large diameter spacer sleeves 56A, 56B engage opposite sides of each scraper element 34, respectively. The outside diameter of the spacer sleeve portions is large relative to the diameter of the tension cable 36, with engagement of the spacer sleeve portions 56A, 56B occurring near the scraping edge 34A. A spacer coil 54 having a diameter substantially equal to the spacer sleeve diameter is compressively engaged between adjoining sleeve portions. In this arrangement, the range of scraper deflection is somewhat limited, but deflection forces are reacted substantially by axial compression of the spacer coil 54.

Figure 7:
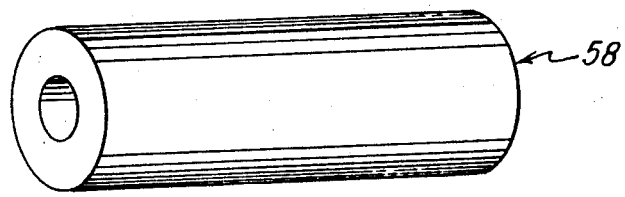
FIG. 7 is a perspective view of a spacer sleeve.
Figure 8:
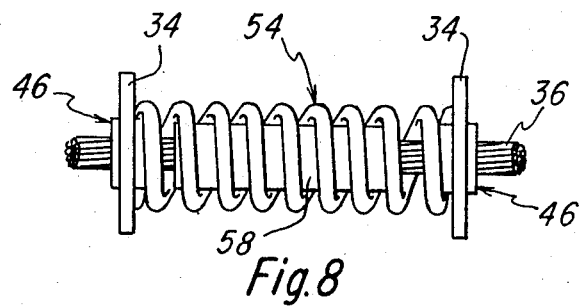
FIG. 8 is a partial side elevational view of yet another scraper assembly which includes the spacer of FIG. 7, shown prior to compression.
Figure 9:
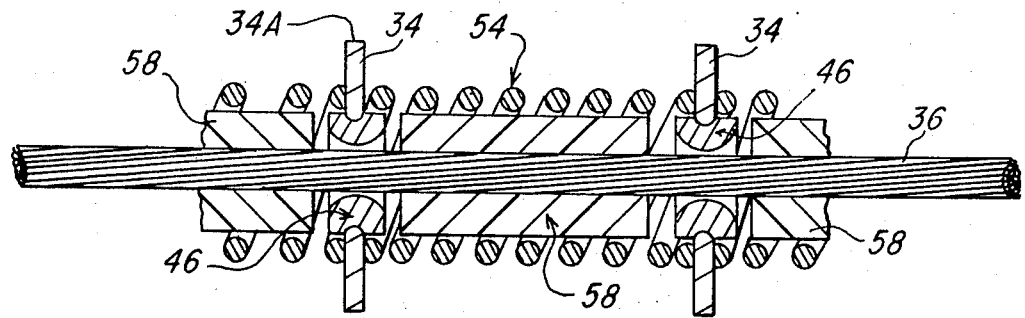
FIG. 9 is a sectional view of the scraper assembly of FIG. 9 in fully compressed condition.

Referring now to FIGS. 7, 8 and 9, a spacer sleeve 58 is fitted about the tension member 36 between two scraper elements 34. A large diameter compression coil 54 is fitted coaxially about the spacer sleeve 58. As can be seen in FIGURE 8, the spacer sleeve 58 is shorter in length than the coil spring 54 when it is compressed to the desired loading level as can best be seen in FIG. 9. In the embodiment illustrated in FIGS. 8 and 9, the spacer sleeve 58 is formed of a resilient, polymer material, for example polyurethane. However, in the embodiment of FIGS. 8 and 9, the spacer sleeve 58 need not be resilient, and may be constructed of a rigid material such as stainless steel or aluminum. In this arrangement, light deflection forces are reacted primarily by axial compression of the coil spring 54, with large excursion deflection forces being absorbed by the coil spring 54 and resilient spacer sleeve 58 acting in parallel.

Figure 10:
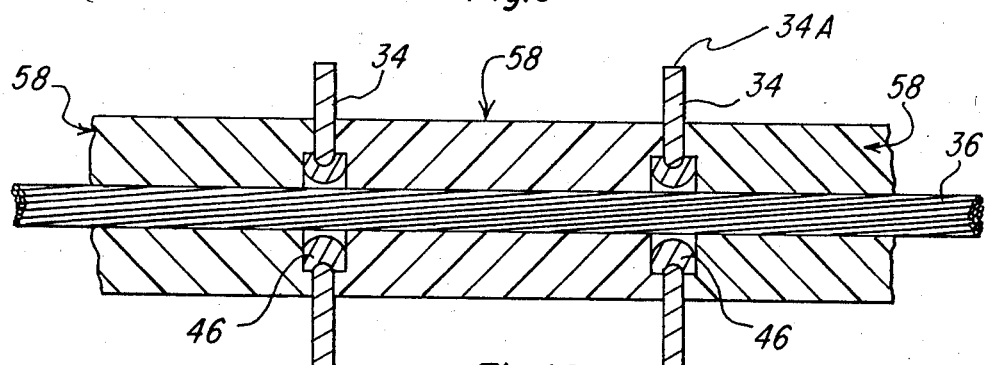
FIG. 10 is a sectional view of yet another scraper assembly.

In yet another embodiment, as shown in FIG. 10, the spacer spring 54 is eliminated, with a spacer sleeve 58 of resilient material being compressed between adjacent scraper elements 34. In this arrangement, the spacer sleeve 58 has a diameter which is large relative to the diameter of the tension member 36, and yieldably separates the scraper elements. Deflection loading is absorbed by axial compression of spacer sleeve 58, with the deflection range being compromised relative to the preferred embodiment of FIG. 3.

Figure 11:
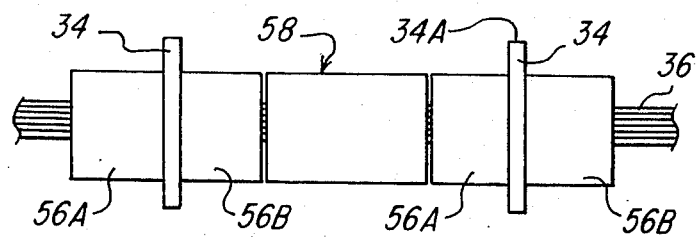
FIG. 11 is an elevational view of yet another scraper assembly.

In the articulated spacer sleeve arrangement shown in FIG. 11, the large diameter spacer sleeves 56A, 56B engage opposite sides of a scraper element 34, respectively. This arrangement is somewhat similar to that shown in FIG. 6, but with a solid spacer sleeve 58 threaded about the tension member 36 and compressively confined between the spacer sleeves 56A, 56B of adjoining scraper elements. The scraper deflection range is limited relative to the range provided by the preferred embodiment of FIG. 3. Preferably, the spacer block is resilient whereby it will axially react and absorb deflection forces.

In each of the foregoing embodiments, the radial component of scraper deflection loading is substantially decoupled with respect to the tension member, with the deflection loading being applied axially across a large diameter spacer spring or by a large diameter spacer sleeve, or some combination thereof. Additional protection against pinching engagement is provided by the extended shoulder portions of the ferrule insert. The various embodiments disclosed herein will accomodate a wide range of scraper load conditions, with maximum scraper deflection range and good cable protection being provided by the FIG. 3 and FIG. 4 embodiments, and with somewhat limited scraper deflection range, but good cable protection being provided by the remaining embodiments. The overall result, therefore, is an improvement in reliability of the scraper strands without compromising performance.

Although the invention has been described with reference to multiple preferred embodiments, and with reference to preferred materials, the foregoing description is not intended to be construed in a limiting sense. Various modifications of the disclosed embodiments as well as alternative applications of the invention will be suggested to persons skilled in the art by the foregoing specifications and illustrations. For example, the scraper/tension member combinations can be incorporated and used to good advantage for cleaning the face of a pulley drum. It is therefore contemplated that the appended claims will cover any such modifications or embodiments that fall within the true scope of the invention.

What is claimed is:

1. A conveyor belt cleaning device comprising, in combination:
   a flexible tension member;
   a plurality of wear-resistant scraper elements movably coupled to said tension member, each scraper element having an edge for engaging a conveyor belt;
   spacer means compressively engaging and yieldably separating said scraper elements, whereby scraper element deflection forces are reacted substantially by axial compression of said spacer means, and with the radial components of the deflection forces being substantially decoupled with respect to said tension member, said spacer means including a compression coil spring having a large diameter and turn portion engaging a scraper element at a location nearer to its belt engaging edge than to said tension member, and said compression coil spring having a reduced diameter coil portion, said coil spring being flared from the reduced diameter coil portion to the large diameter end turn portion.

2. The conveyor belt cleaning device as defined in claim 1, each scraper element including:
an insert ferrule having a central opening bordered by a rounded shoulder through which said tension member is threaded.

3. In a conveyor belt assembly of the type having an endless conveyor belt driven by a head pulley drum, the improvement comprising a conveyor belt cleaning device mounted beneath the overhang defined by the head pulley drum, and engaging the curved surface of the conveyor belt in the overhang region where the conveyor belt is in contact with the head pulley drum, said belt cleaning device including an elongated, flexible tension member, a plurality of scraper elements movably coupled to said tension member, and resilient spacer means compressively engaging and yieldably separating said scraper elements, said resilient spacer means having a radially flared portion for reacting scraper element deflection forces substantially by compression of said radially flared portion, and with the radial components of the deflection forces being substantially decoupled with respect to said tension member.

4. A conveyor belt cleaning assembly adapted to be located beneath the overhang defined by a head pulley drum, including a plurality of conveyor belt cleaning members adapted to be extended in similar paths relative to the conveyor belt such that each follows the path of a multistart thread of large pitch, each of the conveyor cleaning members including a series of abrasion-resistant scraper elements movably threaded onto a flexible strand, each scraper element having an edge for engaging a conveyor belt, resilient spacer means threaded onto said strand, said resilient spacer means compressively engaging and yieldably separating said scraper elements, and including means for reacting spacer deflection loading axially through said spacer means while effectively decoupling the axial component of such loading with respect to said flexible strand, said load reacting means including a compression coil spring having an end turn portion engaging a scraper element at a location nearer to its belt engaging edge than to said flexible strand.

* * * * *